US012396001B2

(12) United States Patent
Han et al.

(10) Patent No.: US 12,396,001 B2
(45) Date of Patent: Aug. 19, 2025

(54) METHODS AND DEVICES FOR DATA TRANSMISSION BASED ON SWITCHING QUALITY OF SERVICE FLOW

(71) Applicant: ZTE Corporation, Shenzhen (CN)

(72) Inventors: Jiren Han, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 386 days.

(21) Appl. No.: 17/885,832

(22) Filed: Aug. 11, 2022

(65) Prior Publication Data
US 2022/0386290 A1    Dec. 1, 2022

Related U.S. Application Data

(63) Continuation of application No. PCT/CN2020/075109, filed on Feb. 13, 2020.

(51) Int. Cl.
*H04W 72/04*      (2023.01)
*H04W 36/00*      (2009.01)
*H04W 72/21*      (2023.01)
*H04W 72/23*      (2023.01)
*H04W 72/543*     (2023.01)

(52) U.S. Cl.
CPC ........ *H04W 72/23* (2023.01); *H04W 36/0011* (2013.01); *H04W 72/21* (2023.01); *H04W 72/543* (2023.01)

(58) Field of Classification Search
CPC ......... H04W 36/0011; H04W 36/0027; H04W 36/0033; H04W 72/21; H04W 72/23; H04W 72/543; H04W 76/11; H04W 76/22
See application file for complete search history.

(56) References Cited

U.S. PATENT DOCUMENTS

2018/0359672 A1    12/2018  Keller et al.
2019/0059027 A1*    2/2019  Yang ................. H04W 36/0064
(Continued)

FOREIGN PATENT DOCUMENTS

| CN | 108024294 A | 5/2018 |
| CN | 110249659 A | 9/2019 |
| EP | 3598838 A1 | 1/2020 |

OTHER PUBLICATIONS

Indonesian Office Action, Aug. 16, 2024, pp. 1-6, issued in Application No. P00202209483, Ministry of Law and Human Rights Republic of Indonesia, Jakarta, Indonesia.
(Continued)

*Primary Examiner* — Mansour Oveissi
(74) *Attorney, Agent, or Firm* — Crowell & Moring LLP

(57) ABSTRACT

The present disclosure describes methods, system, and devices for switching a quality of service (QoS) flow from a source network node to a target network node. The method includes sending, by a first network node, a first request to the target network node; receiving, by the first network node, a first response to the first request from the target network node; and sending, by the first network node, a second request to the source network node. The method may also include receiving, by the first network node, a second response to the second request from the source network node; and sending, by the first network node, a radio resource control (RRC) reconfiguration complete indication to the source network node.

8 Claims, 13 Drawing Sheets

(56) References Cited

U.S. PATENT DOCUMENTS

| | | |
|---|---|---|
| 2019/0069333 A1 | 2/2019 | Kim |
| 2019/0394680 A1 | 12/2019 | Yu |
| 2020/0008113 A1 | 1/2020 | Chen |
| 2021/0211926 A1* | 7/2021 | Han ..................... H04W 76/27 |

OTHER PUBLICATIONS

Chinese Office Action with English translation, Jun. 19, 2024, pp. 1-17, issued in Chinese Patent Application No. 202080083611.0, State Intellectual Property Office, Beijing, China.
Report on the Prosecution with English translation, Jun. 18, 2024, pp. 1-8, issued in Chinese Patent Application No. 2020800836110, State Intellectual Property Office, Beijing, China.
Nokia Siemens Networks, Nokia, Conditional sending of R99 QoS profile to UE, Jul. 6-10, 2009, pp. 1-21, 3GPP TSG-SA WG2 Meeting #74, S2-094583, Sophia-Antipolis, France.
Extended European Search Report regarding EP 20 88 8210 dated May 25, 2023, 10 pages.
"3rd Generation Partnership Project; Technical Specification Group Radio Access Network; NG-RAN; Architecture description (Release 16)," 3GPP Standard; Technical Specification; 3GPP TS 38.401, 3rd Generation Partnership Project (3GPP), Mobile Competence Centre; 650, Route Des Lucioles; F-06921 Sophia_Antipolis Cedex; France vol. RAN WG3, No. VI6.0.0, Jan. 9, 2020, pp. 1-49, XP051860623, Retrieved from the Internet: URL:ftp://ftp.39pp.org/Specs/archive/38_series/38.401/38401-g00.zip 38401-g00.doc
Nokia et al., "Discussion on overall procedure for some DRBs to be released," 3GPP Draft; R3-195367 DISC/DRB to be Released, 3rd Generation Partnership Project (3GPP), Mobile Competence Centre; 650, Route Des Lucioles; F-06921, Sophia-Antipolis Cedex; France vol. RAN WG3, No. Chongqing, China; Oct. 14, 2019-Oct. 18, 2019, Oct. 4, 2019, XP051810279, Retrieved from the Internet: URL:https://ftp.3gpp.org/tsg_ran/WG3_lu/TS GR3_105bis/Docs/R3-195367.zip.
Search Report and Written Opinion, Dec. 18, 2024, pp. 1-11, issued in Patent Application No. 11202250719J, Intellectual Property Office of Singapore, Singapore.
International Search Report and Written Opinion regarding PCT/CN2020/075109 dated May 29, 2020, 10 pages.
3GPP. "Study of separation of NR Control Plane (CP) and User Plane," *3GPP TR 38.806*, Dec. 31, 2017.

* cited by examiner

400 sending, by a first network node, a first request to the target network node;
410 receiving, by the first network node, a first response to the first request from the target network node;
420 sending, by the first network node, a second request to the source network node;
430 receiving, by the first network node, a second response to the second request from the source network node
440 sending, by the first network node, a radio resource control (RRC) reconfiguration complete indication to the source network node
450

```
┌─────────────────────────────────────────────────────────────────┐
│ switching a quality of service (QoS) flow by a first network node from a source │
│           network node to a target network node;                │
│                                                          910    │
└─────────────────────────────────────────────────────────────────┘
                                │
                                ▼
┌─────────────────────────────────────────────────────────────────┐
│ continuously receiving first uplink user data by the target network node from the user │
│                          equipment;                             │
│                                                          920    │
└─────────────────────────────────────────────────────────────────┘
                                │
                                ▼
┌─────────────────────────────────────────────────────────────────┐
│   receiving a first uplink end-marker by the source network node from the user │
│                          equipment;                             │
│                                                          930    │
└─────────────────────────────────────────────────────────────────┘
                                │
                                ▼
┌─────────────────────────────────────────────────────────────────┐
│ upon receiving the first uplink end-marker, determining by the source network node │
│  whether the source network node finishes sending second uplink user data to the │
│ core network, wherein the second uplink user data is received by the source network │
│                   node from the user equipment;           940   │
└─────────────────────────────────────────────────────────────────┘
                                │
                                ▼
┌─────────────────────────────────────────────────────────────────┐
│  in response to the determination that the source network node finishes sending │
│ second uplink user data to the core network, sending a second uplink end-marker by │
│            the source network node to the target network node;  │
│                                                          950    │
└─────────────────────────────────────────────────────────────────┘
                                │
                                ▼
┌─────────────────────────────────────────────────────────────────┐
│  upon receiving the second uplink end-marker, sending the first uplink user data by │
│              the target network node to the core network        │
│                                                          960    │
└─────────────────────────────────────────────────────────────────┘
```

FIG. 9

METHODS AND DEVICES FOR DATA TRANSMISSION BASED ON SWITCHING QUALITY OF SERVICE FLOW

CROSS-REFERENCE TO RELATED APPLICATION

This application is a continuation application of PCT International Patent Application No. PCT/CN2020/075109, filed with the China National Intellectual Property Administration, PRC on Feb. 13, 2020, which is herein incorporated by reference in its entirety.

TECHNICAL FIELD

The present disclosure is directed generally to wireless communications. Particularly, the present disclosure relates to methods and devices for data transmission based on switching a quality of service (QoS) flow.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. A wireless base station may transmit data to and from a user equipment based on a quality of service (QoS) flow. The wireless base station may include a control plan and more than one user planes. The present disclosure describes methods and devices for data transmission based on switching the QoS flow from one user plane to another user plane. The present disclosure may address at least some of issues associated with the existing system to improve the performance of the wireless communication.

SUMMARY

This document relates to methods, systems, and devices for wireless communication and more specifically, for data transmission based on switching a quality of service (QoS) flow.

In one embodiment, the present disclosure describes a method for wireless communication. The method includes switching, by a first network node, a quality of service (QoS) flow from a source network node to a target network node by: sending, by the first network node, a first request to the target network node; receiving, by the first network node, a first response to the first request from the target network node; and sending, by the first network node, a second request to the source network node. The method may also include receiving, by the first network node, a second response to the second request from the source network node; and sending, by the first network node, a radio resource control (RRC) reconfiguration complete indication to the source network node.

In another embodiment, the present disclosure describes a method for wireless communication. The method includes transmitting user data between a user equipment and a core network by: switching a quality of service (QoS) flow by a first network node from a source network node to a target network node; continuously receiving first uplink user data by the target network node from the user equipment; receiving a first uplink end-marker by the source network node from the user equipment; and upon receiving the first uplink end-marker, determining by the source network node whether the source network node finishes sending second uplink user data to the core network. The second uplink user data is received by the source network node from the user equipment. The method may also include in response to the determination that the source network node finishes sending the second uplink user data to the core network, sending a second uplink end-marker by the source network node to the target network node; and upon receiving the second uplink end-marker, sending the first uplink user data by the target network node to the core network.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 9 shows a flow diagram of a method for wireless communication.

DETAILED DESCRIPTION

Figure 1A:
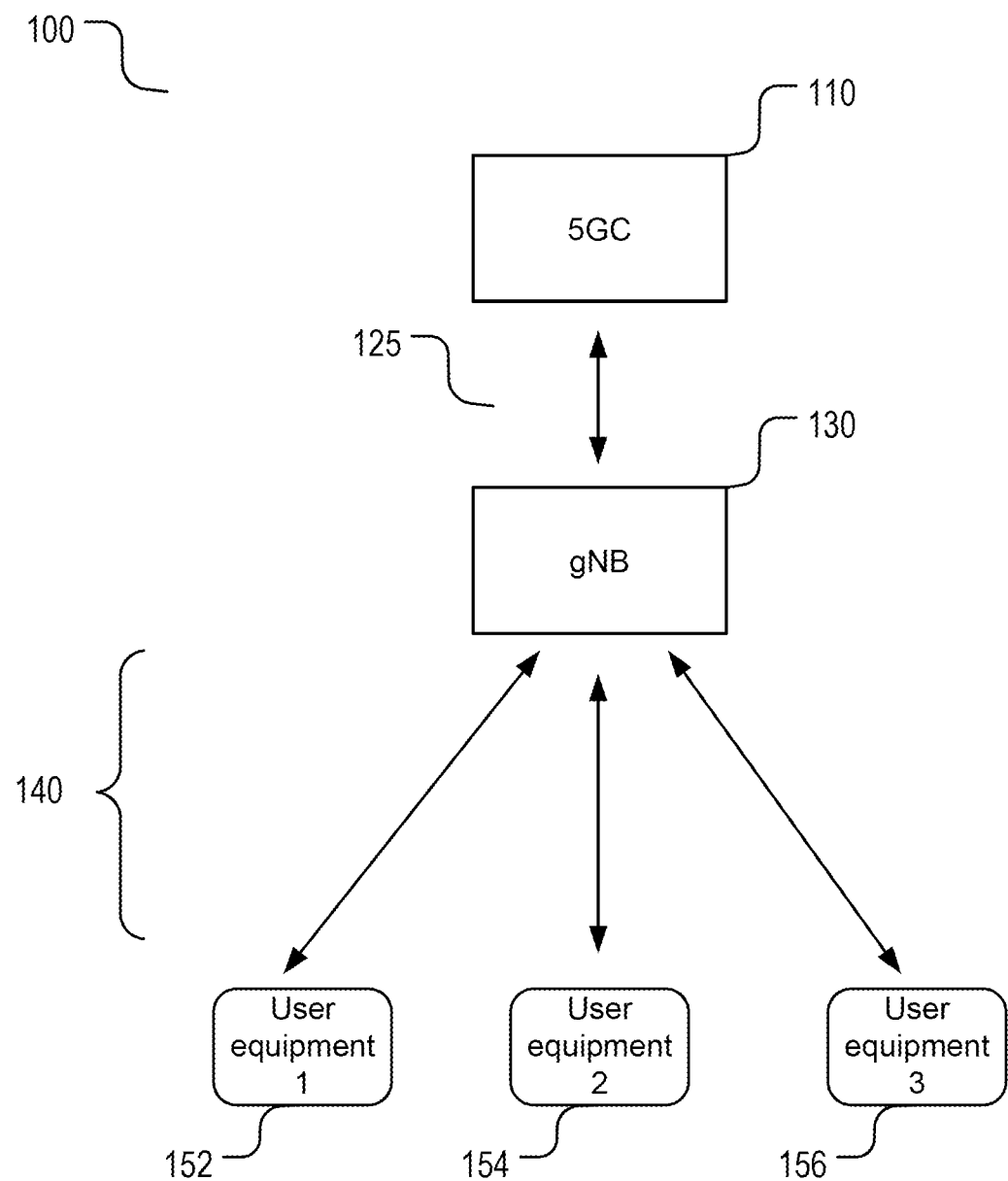
FIG. 1A shows an example of a wireless communication system include a core network, a wireless network node, and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for data transmission based on switching the QoS flow.

Next generation (NG), or 5th generation (5G), wireless communication may provide a range of capabilities from downloading with fast speeds to support real-time low-latency communication. This range of capabilities may need some characteristics of quality of service (QOS), such as delay, error rate, priority level, and, etc. In NG wireless communication, one or more service data flows with same QoS characteristics may be grouped together as a QoS flow. Each QoS flow may be identified by a QoS flow identifier, informing the network components the corresponding characteristics of the QoS flow.

FIG. 1A shows a wireless communication system 100 including a core network 110, a wireless network base station 130, and one or more user equipment (UE) (152, 154, and 156). The wireless network base station 130 may be a NG radio access network (NG-RAN) base station or node, which may include a nodeB (NB, e.g., a gNB) in a mobile telecommunications context. Each of the UE may wirelessly communicate with the wireless network base station 130 via one or more radio channels 140. For example, a first UE 152 may wirelessly communicate with the gNB 130 via a channel including a plurality of radio channels during a certain period of time. Likewise, a second UE 154 and a third UE 156 may wirelessly communicate with the gNB 130. The wireless network base station 130 may communicate with a core network 110 through an interface 125. In one implementation, the core network 110 may include a 5G core network (5GC), and the interface 125 may include a NG interface.

Figure 1B:
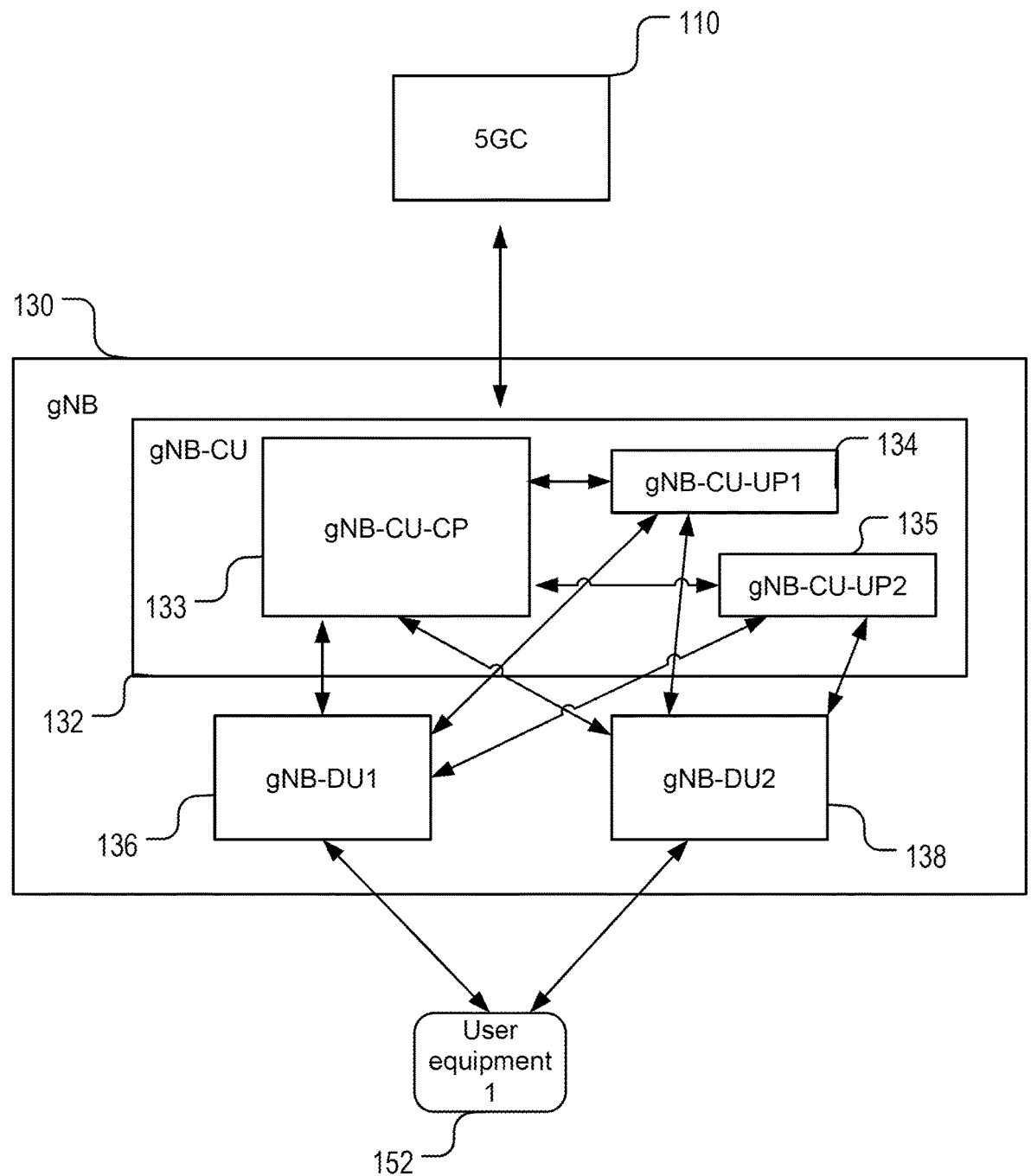
FIG. 1B shows an example of an architecture of the wireless network node in FIG. 1A.

A wireless network base station (e.g., gNB) may include an architecture of separating a central unit (CU) and one or more distributed units (DUs). Referring to FIG. 1B, the gNB 130 may include a gNB-CU 132, a first distributed unit 136 (gNB-DU1), and a second distributed unit 138 (gNB-DU2). The gNB-CU 132 may communicate and manage the gNB-DU1 136 and the gNB-DU2 138. The one or more DUs may communicate with one or more user equipment (e.g., the user equipment 152).

Referring to FIG. 1B, the gNB-CU 132 may include an architecture including a control plane (CP) 133 (gNB-CU-CP) and one or more user planes (UPs) (134 and 135). The gNB-CU-CP 133 may communicate and control the first UP (gNB-CU-UP1) 134 and the second UP (gNB-CU-UP2) 135.

One gNB-CU-UP may communicate with one or more gNB-DUs, and one gNB-DU may communicate with one or more gNB-CU-UPs. For example referring to FIG. 1B, the gNB-CU-UP1 134 may communicate with the gNB-DU1 136 and/or the gNB-DU2 138; and the gNB-DU1 may communicate with the gNB-CU-UP1 134 and/or the gNB-CU-UP2 135.

In the wireless communication system 100 in FIG. 1A, the core network 110 may provide service to the user equipment by establishing one or more protocol data unit (PDU) sessions. A PDU session may include one or more QoS flows. For each user equipment, at least one data radio bearer (DRB) may be established for the PDU session. The to-be-transmitted data associated with different PDU sessions may be mapped onto different DRB; and one or more QoS flows may have a mapping relationship with the one or more DRBs. For a DRB, the user equipment may monitor a QoS flow identifier (ID) of downlink data packets and send uplink data using the corresponding mapping relationship, which may refer to as reflective QoS flow remapping.

In one implementation, referring to FIG. 1A, a DRB for a PDU session may be setup through gNB-CU-UP1 134 and a corresponding QoS flow may be setup through gNB-CU-UP1 134. Under a certain circumstances, for example but not limited to, during reflective QoS flow remapping, the QoS flow may need to switch from the gNB-CU-UP1 134 to the gNB-CU-UP2 135. The present disclosure describes embodiments of methods and devices for switching QoS flow from one network node (e.g., the gNB-CU-UP1 134) to another network node (e.g., the gNB-CU-UP2 135).

Figure 2:
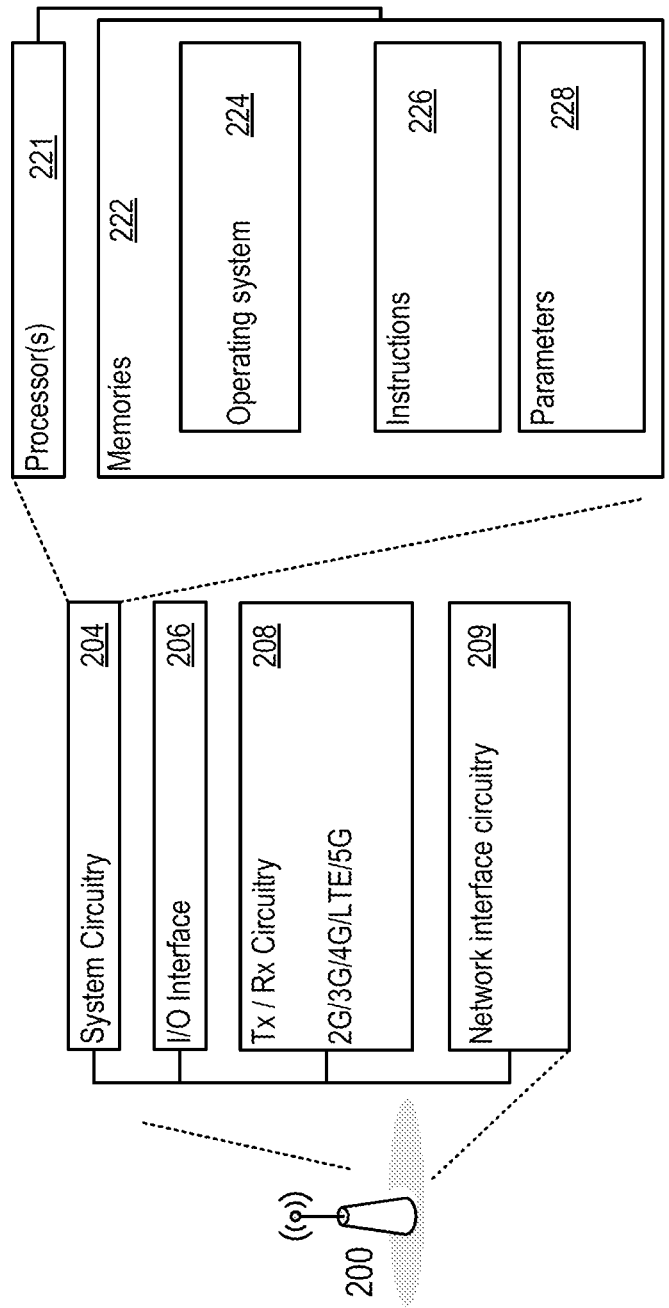
FIG. 2 shows an example of a wireless network node.

FIG. 2 shows an exemplary wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
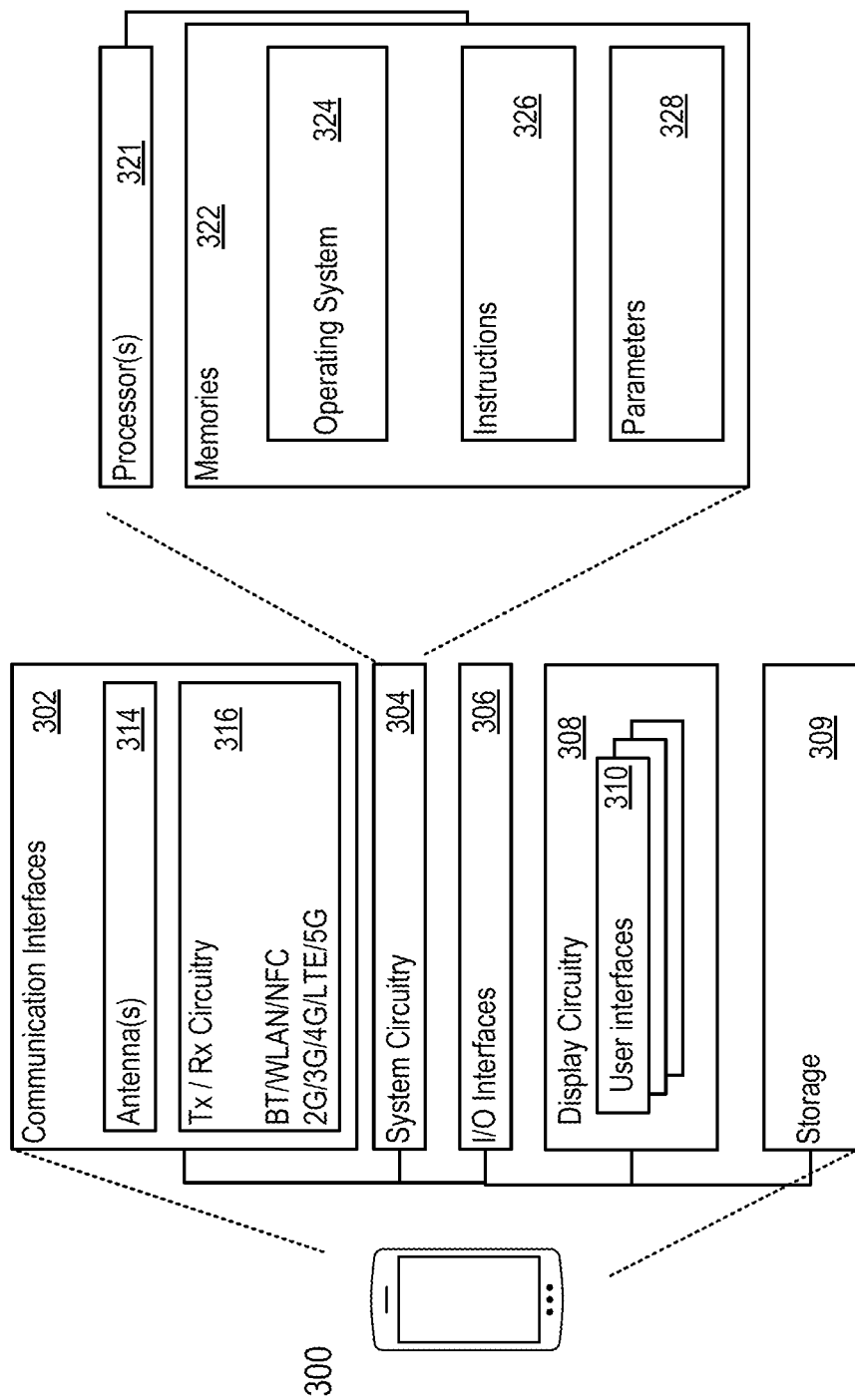
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for switching a quality of service (QoS) flow from a source network node to a target network node, which may be implemented, partly or totally, on the wireless network base station and/or the user equipment described above in FIGS. 2 and 3.

In one embodiment, referring to FIG. 4, a method 400 may include a portion or all of the following: step 410, sending, by a first network node, a first request to the target network node; step 420 receiving, by the first network node, a first response to the first request from the target network node; step 430, sending, by the first network node, a second request to the source network node; step 440, receiving, by the first network node, a second response to the second request from the source network node; and step 450, sending, by the first network node, a radio resource control (RRC) reconfiguration complete indication to the source network node.

Figure 5:
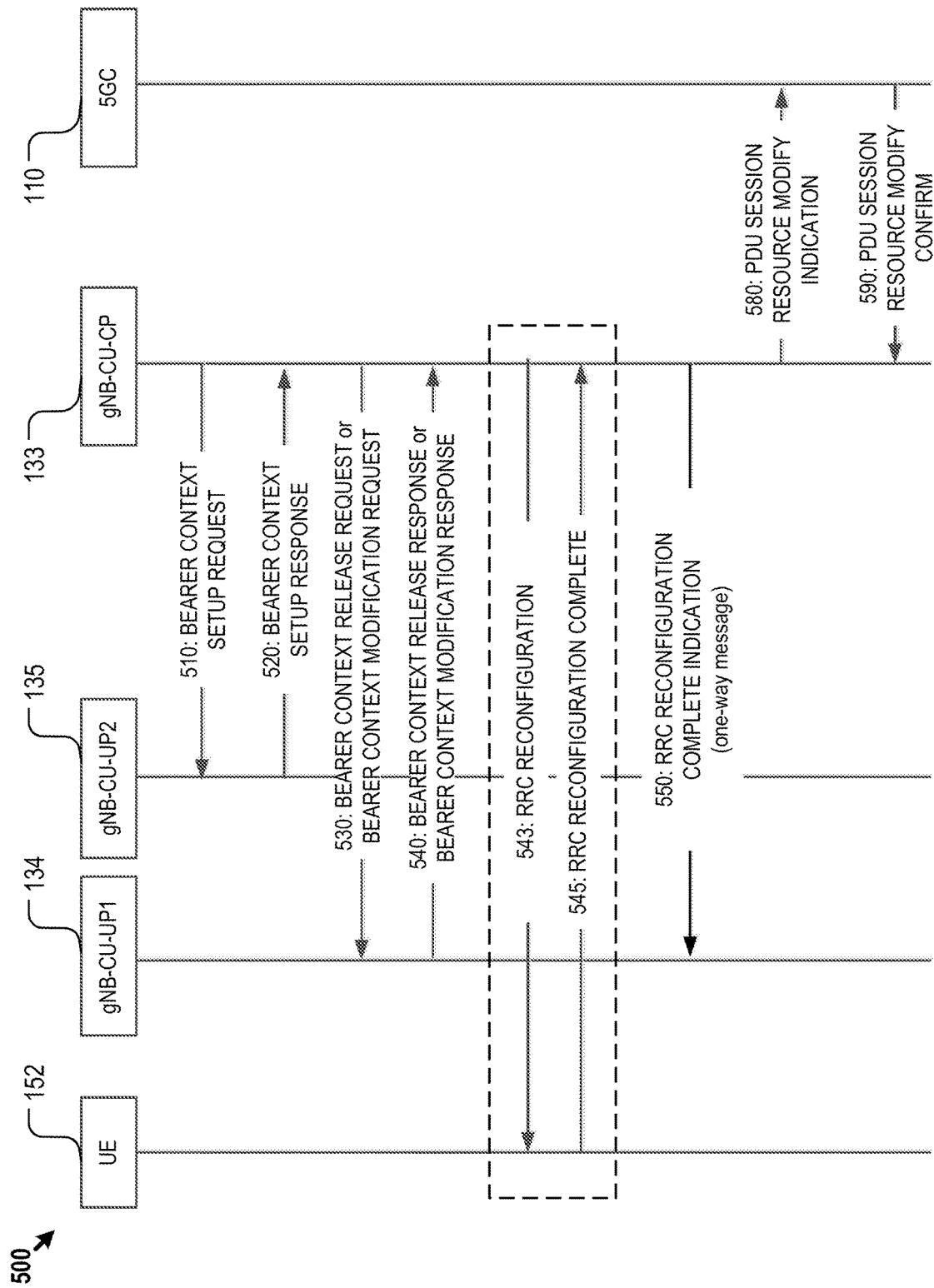
FIG. 5 shows an exemplary logic flow of the method for wireless communication in FIG. 4.

FIG. 5 shows an exemplary logic flow of a method 500 for switching a quality of service (QoS) flow from a source network node to a target network node. The source network node 134 may be a gNB-CU-UP1, the target network node 135 may be a gNB-CU-UP2, the first network node 133 may be a gNB-CU-CP, and a core network 110 may be a 5GC.

The method 500 may include step 510: the gNB-CU-CP sends a bearer context setup request to the gNB-CU-UP2. The bearer context setup request may be the first request in step 410 in FIG. 4. In one implementation, the bearer context setup request may include a list of to-be-setup data radio bearers (DRBs). The list of to-be-setup DRBs may include one or more DRBs based on the QoS flow.

The method 500 may include step 520: upon receiving the bearer context setup request from the gNB-CU-CP, the gNB-CU-UP2 may send a bearer context setup response to the gNB-CU-CP. The bearer context setup response may be the first response in step 420 in FIG. 4. In one implementation, the bearer context setup response may include data-forwarding information. The data-forwarding information may include information related to a general packet radio service (GPRS) tunneling protocol (GTP) tunnel information.

The method 500 may include step 530: the gNB-CU-CP sends a bearer context release request (or a bearer context modification request) to the gNB-CU-UP1. The bearer context release request (or the bearer context modification request) may be the second request in step 430 in FIG. 4. The method 500 may further include step 540: upon receiving the bearer context release request (or the bearer context modification request) from the gNB-CU-CP, the gNB-CU-UP1 may send a bearer context release response (or a bearer context modification response) to the gNB-CU-CP. The bearer context release response (or the bearer context modification response) may be the second response in step 430 in FIG. 4.

In one implementation, the bearer context release request may include a list of to-be-released DRBs. The list of to-be-released DRBs may include one or more DRBs that have been setup for the QoS flow. The bearer context modification request may include a list of to-be-modified DRBs. The list of to-be-modified DRBs may include one or more DRBs based on the QoS flow. In another implementation, the bearer context release request (or the bearer context modification request) may further include the data-forwarding information.

In one implementation of steps 530 and 540, when the gNB-CU-CP sends the bearer context release request to the gNB-CU-UP1, the gNB-CU-UP1 may send the bearer context release response to the gNB-CU-CP. In another implementation of steps 530 and 540, when the gNB-CU-CP sends the bearer context modification request to the gNB-CU-UP1, the gNB-CU-UP1 may send the bearer context modification response to the gNB-CU-CP.

Optionally, the method 500 may include step 543: the gNB-CU-CP sends a radio resource control (RRC) reconfiguration to a user equipment (UE). In one implementation, the gNB-CU-CP may send the RRC reconfiguration to a gNB-DU, and then the gNB-DU may send the RRC reconfiguration to the user equipment. For example, the gNB-DU may be one of the gNB-DU1 or gNB-DU2 in FIG. 1B. Upon receiving the RRC reconfiguration, the UE may perform the RRC reconfiguration. Optionally, the method 500 may include step 545: the UE may send a RRC reconfiguration complete to gNB-CU-CP. The RRC reconfiguration complete indicates a completion of a RRC reconfiguration.

Referring to FIG. 5, the method 500 may include step 550: the gNB-CU-CP sends the RRC reconfiguration complete indication to the gNB-CU-UP1. The RRC reconfiguration complete indication sent in step 550 may be a one-way message belongs to a class 2 procedure, so that upon receiving the RRC reconfiguration complete indication, the gNB-CU-UP1 not need to send a response back to the gNB-CU-CP.

Optionally, the method 500 may include step 580: the gNB-CU-CP sends a protocol data unit (PDU) resource modify indication to the 5GC. The PDU session resource modify indication may indicate the 5GC that one or more PDU sessions have been updated, and/or a mapping relationship between one or more QoS flow and one or more downlink tunnels. In one implementation, the PDU session resource modify indication may include a downlink tunnel corresponding to the QoS flow.

Optionally, the method 500 may include step 590: upon receiving the PDU session resource modify indication, the 5GC sends a PDU session resource modify confirm to the gNB-CU-CP. In one implementation, the PDU session resource modify confirm may include an uplink tunnel corresponding to the QoS flow.

Figure 6:
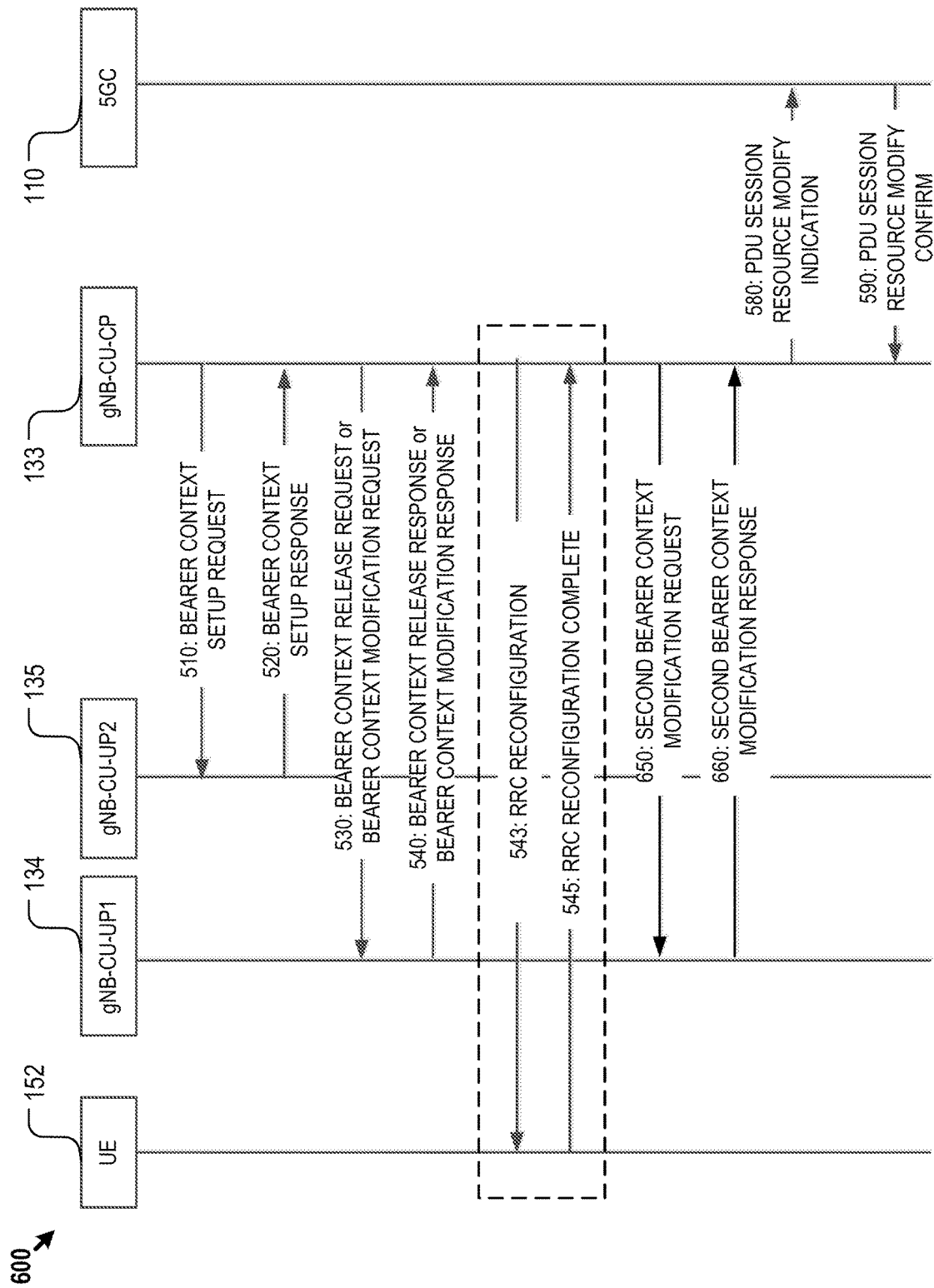
FIG. 6 shows another exemplary logic flow of the method for wireless communication in FIG. 4.

The present disclosure describes another embodiment of methods and devices for switching a QoS flow from a source network node to a target network node. FIG. 6 shows an exemplary logic flow of a method 600 for switching a QoS flow from the gNB-CU-UP1 134 to the gNB-CU-CP2 135.

The method 600 may be slightly different from the method 500 in FIG. 5. Steps 650 and 660 are different from step 550. Rather than sending a one-way message to the gNB-CU-UP1 in step 550, the gNB-CU-CP sends a second bearer context modification request to the gNB-CU-UP1 in step 650 and receives a second bearer context modification response from the gNB-CU-UP1 in step 660. In one implementation, the second bearer context modification request may include the RRC reconfiguration complete indication.

Figure 7:
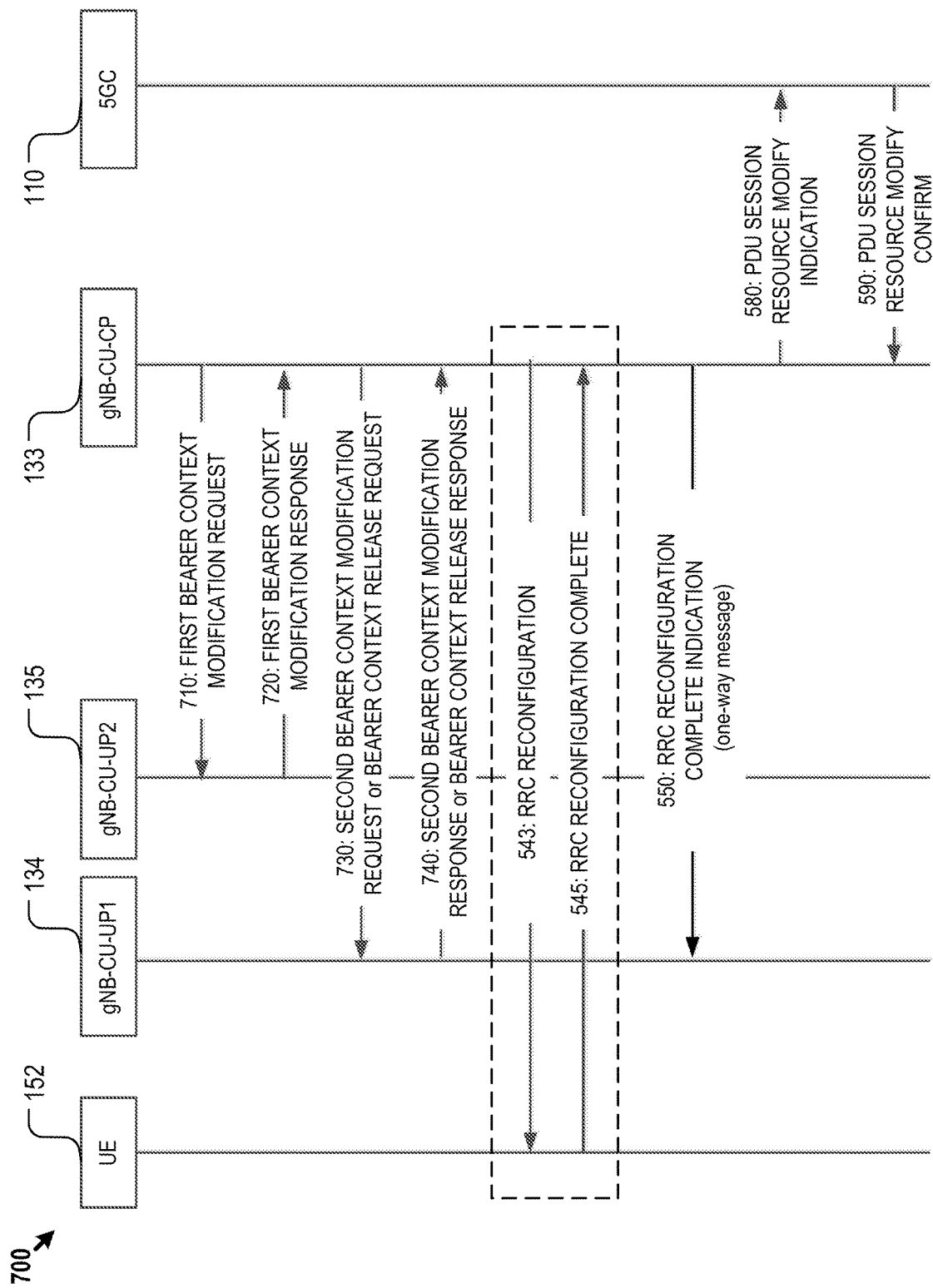
FIG. 7 shows another exemplary logic flow of the method for wireless communication in FIG. 4.

The present disclosure describes another embodiment of methods and devices for switching a QoS flow from a source network node to a target network node. FIG. 7 shows an exemplary logic flow of a method 700 for switching a QoS flow from the gNB-CU-UP1 134 to the gNB-CU-CP2 135.

Steps 710-740 of the method 700 may be different from steps 510-540 of the method 500 in FIG. 5.

In step 710: the gNB-CU-CP sends a first bearer context modification request to the gNB-CU-UP2. The first bearer context modification request may be the first request in step 410 in FIG. 4. In one implementation, the first bearer context modification request may include a list of to-be-modified DRBs. The list of to-be-modified DRBs may include one or more DRBs setup for the QoS flow.

In step 720: upon receiving the first bearer context modification request from the gNB-CU-CP, the gNB-CU-UP2 may send a first bearer context modification response to the gNB-CU-CP. The first bearer context modification response may be the first response in step 420 in FIG. 4. In one implementation, the first bearer context modification response may include data-forwarding information. The data-forwarding information may include information related to a GTP tunnel.

In step 730: the gNB-CU-CP sends a second bearer context modification request (or a bearer context release request) to the gNB-CU-UP1. The second bearer context modification request (or the bearer context release request) may be the second request in step 430 in FIG. 4.

In step 740: upon receiving the second bearer context modification request (or the bearer context release request) from the gNB-CU-CP, the gNB-CU-UP1 may send a second bearer context modification response (or a bearer context release response) to the gNB-CU-CP. The second bearer context modification response may be the second response in step 430 in FIG. 4.

In one implementation, the second bearer context modification request may be same as the first bearer context modification request, which may include the list of to-be-modified DRBs. In another implementation, the second bearer context modification request may be different from the first bearer context modification request. The second bearer context modification request may include another list of to-be-modified DRBs. The another list of to-be-modified DRBs may include one or more DRBs that have been setup for the QoS flow. In another implementation, the bearer context release request may further include the data-forwarding information.

In one implementation, the second bearer context modification response may be same as the first bearer context modification response. In another implementation, the second bearer context modification response may be different from the first bearer context modification response.

In one implementation, the bearer context release request may include a list of to-be-released DRBs. The list of to-be-released DRBs may include one or more DRBs based on the QoS flow. In another implementation, the bearer context release request may further include the data-forwarding information.

In one implementation of steps 730 and 740, when the gNB-CU-CP sends the bearer context release request to the gNB-CU-UP1, the gNB-CU-UP1 may send the bearer context release response to the gNB-CU-CP. In another implementation of steps 730 and 740, when the gNB-CU-CP sends the second bearer context modification request to the gNB-CU-UP1, the gNB-CU-UP1 may send the second bearer context modification response to the gNB-CU-CP.

Figure 8:
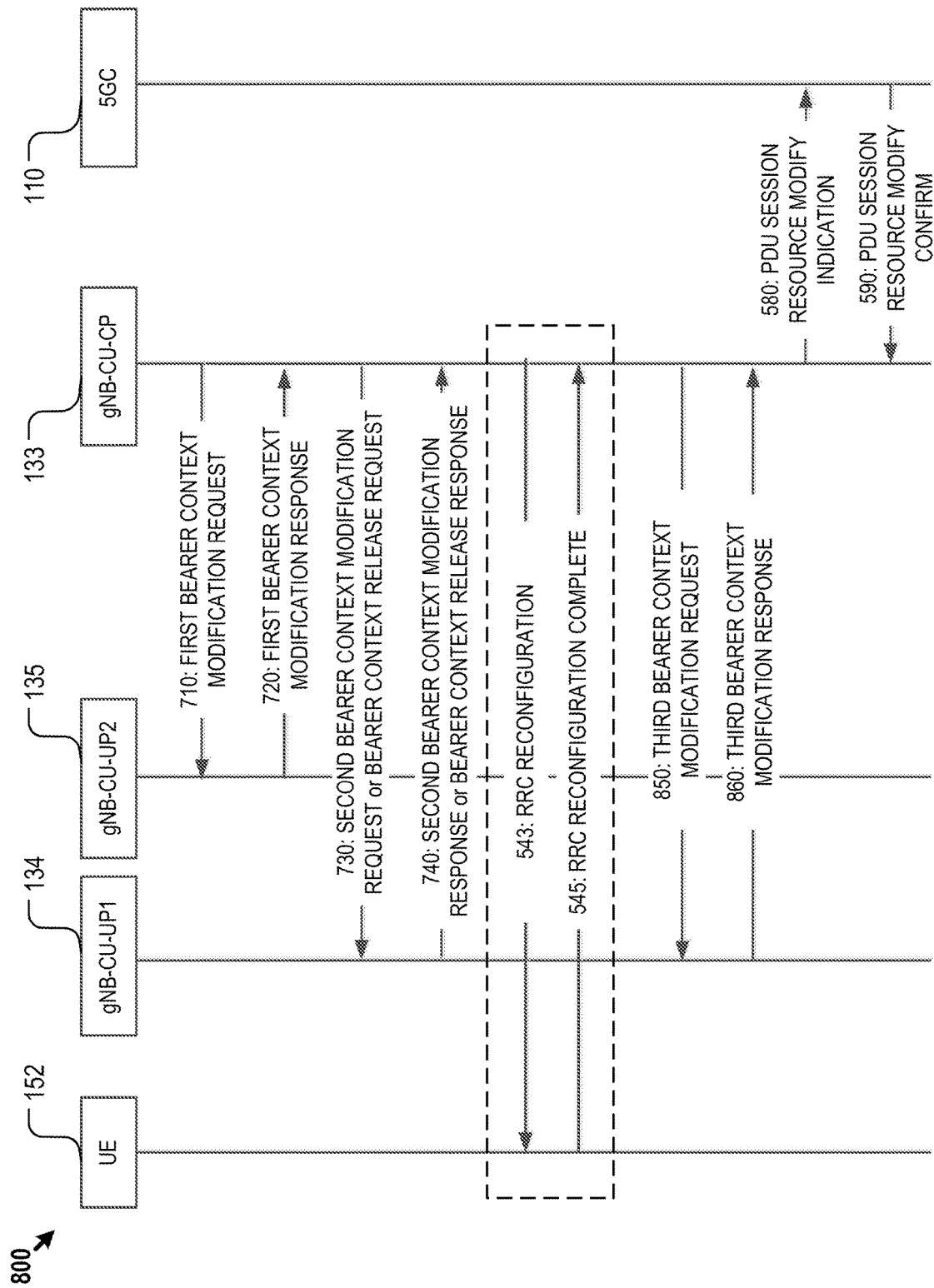
FIG. 8 shows another exemplary logic flow of the method for wireless communication in FIG. 4.

The present disclosure describes another embodiment of methods and devices for switching a QoS flow from a source network node to a target network node. FIG. 8 shows an exemplary logic flow of a method 800 for switching a QoS flow from the gNB-CU-UP1 134 to the gNB-CU-CP2 135.

The method 800 may be slightly different from the method 700 in FIG. 7. Steps 850 and 860 are different from step 550. Rather than sending a one-way message to the gNB-CU-UP1 in step 550 in FIG. 7, the gNB-CU-CP sends a third bearer context modification request to the gNB-CU-UP1 in step 850 and receives a third bearer context modification response from the gNB-CU-UP1 in step 860. In one implementation, the third bearer context modification request may include the RRC reconfiguration complete indication.

The present disclosure describes other embodiments of methods and devices for transmitting user data between a user equipment and a core network. The embodiment may be implemented, partly or totally, on the wireless network base station and/or the user equipment described in FIGS. 2 and 3.

In another embodiment, referring to FIG. 9, a method 900 may include a portion or all of the following: step 910: switching a quality of service (QoS) flow by a first network node from a source network node to a target network node; step 920: continuously receiving first uplink user data by the target network node from the user equipment; step 930: receiving a first uplink end-marker by the source network node from the user equipment; step 940: upon receiving the first uplink end-marker, determining by the source network node whether the source network node finishes sending second uplink user data to the core network, wherein the second uplink user data is received by the source network node from the user equipment; step 950: in response to the determination that the source network node finishes sending second uplink user data to the core network, sending a second uplink end-marker by the source network node to the target network node; and step 960: upon receiving the second uplink end-marker, sending the first uplink user data by the target network node to the core network.

Figure 10:
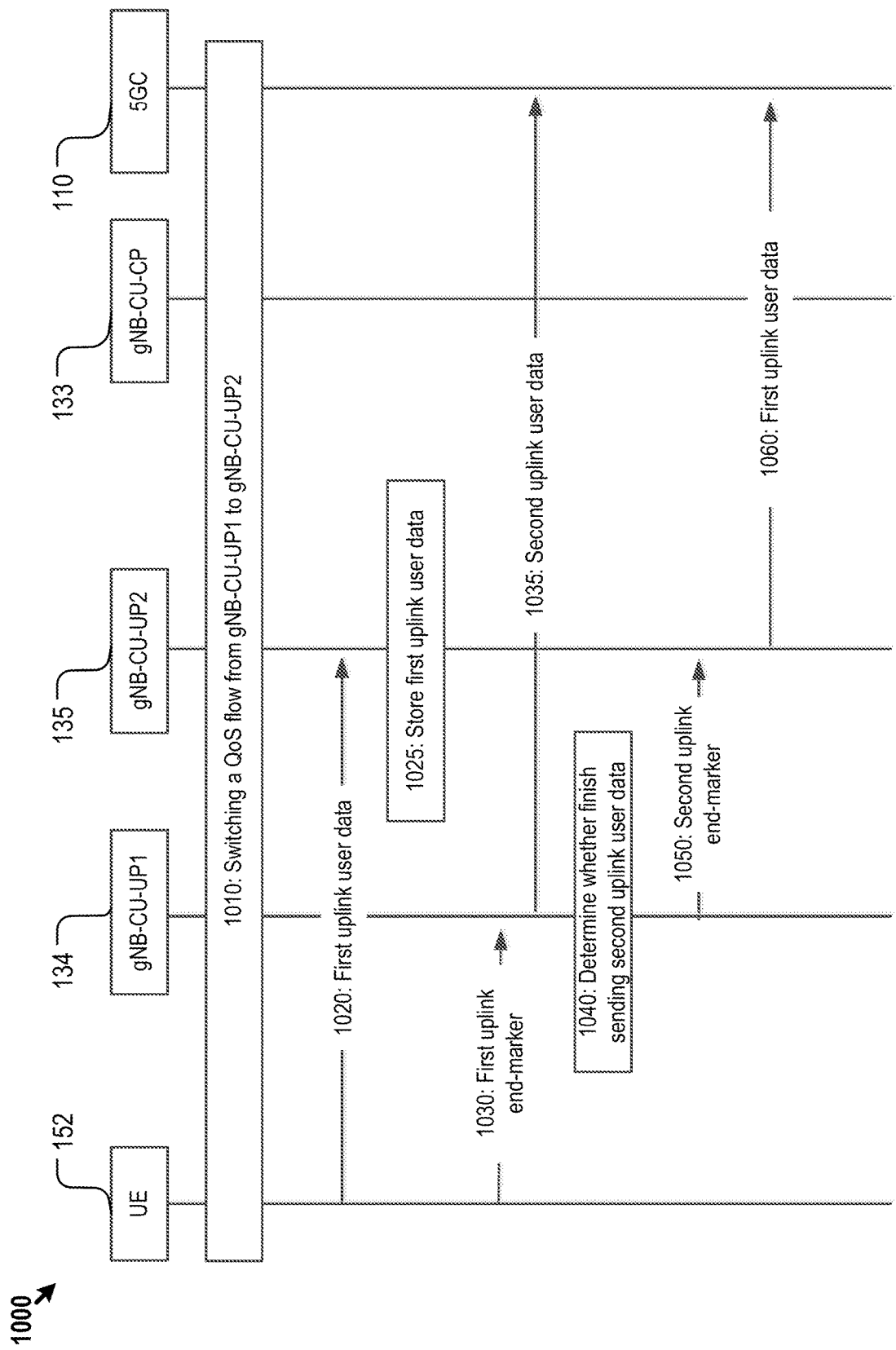
FIG. 10 shows an exemplary logic flow of the method for wireless communication in FIG. 9.

FIG. 10 shows an exemplary logic flow of a method 1000 for transmitting user data between a user equipment 152 (UE) and a core network 110 (e.g., a 5GC) after switching a quality of service (QoS) flow from a source network node 134 (e.g., a gNB-CU-UP1) to a target network node 135 (e.g., a gNB-CU-UP2). The first network node 133 may be a gNB-CU-CP.

The method 1000 may include step 1010: the gNB-CU-CP switches a QoS flow from the gNB-CU-UP1 to the gNB-CU-UP2.

The method 1000 may include step 1020: the UE sends first uplink user data to the gNB-CU-UP2. In one implementation, upon the QoS flow being switched from the gNB-CU-UP1 to the gNB-CU-UP2, the UE begins sending the first uplink user data to the gNB-CU-UP2. The method 1000 may include step 1025: upon receiving the first uplink user data from the UE, the gNB-CU-UP2 stores the received first uplink user data in a buffer (e.g., a buffer in a memory).

The method 1000 may include step 1030: the UE sends a first uplink end-marker to the gNB-CU-UP1. In one implementation, after the QoS flow is switched from the gNB-CU-UP1 to the gNB-CU-UP2, the UE sends the first uplink end-marker to the gNB-CU-UP1. The first uplink end-marker may indicate the gNB-CU-UP1 to stop receiving uplink user data from the UE. In another implementation, the first uplink end-marker may include a service data adaptation protocol (SDAP) end-marker.

Optionally, the method 1000 may include step 1035: the gNB-CU-UP1 sends second uplink user data to the 5GC. The second uplink user data may include user data received by the gNB-CU-UP1 from the UE. In one implementation, step 1035 may be a continuous process with a certain time duration, which may occur before, after, and/or during steps 1010, 1020, 1025, 1030, or 1040.

The method 1000 may include step 1040: upon receiving the first uplink end-marker, the gNB-CU-UP1 may determine whether the gNB-CU-UP1 finishes sending the second uplink user data to the 5GC. The second uplink user data is received by the gNB-CU-UP1 from the UE.

The method 1000 may include step 1050: in response to the determination that the gNB-CU-UP1 finishes sending the second uplink user data to the 5GC, the gNB-CU-UP1 sends a second uplink end-marker to the gNB-CU-UP2. The second uplink end-marker may indicate the gNB-CU-UP2 to begin sending the stored first uplink user data to the 5GC. In one implementation, the second uplink end-marker may include a general packet radio service (GPRS) tunneling protocol-user plane (GTP-U) end-marker. In another implementation, the second uplink end-marker may include a message indicating that the gNB-CU-UP1 completes sending all second uplink user data to a user plane function (UPF).

The method 1000 may include step 1060: upon receiving the second uplink end-marker, the gNB-CU-UP2 sends the first uplink user data to the 5GC. The first uplink user data may be the data stored by the gNB-CU-UP2 in step 1025, which is received from the UE in step 1020.

Figure 11:
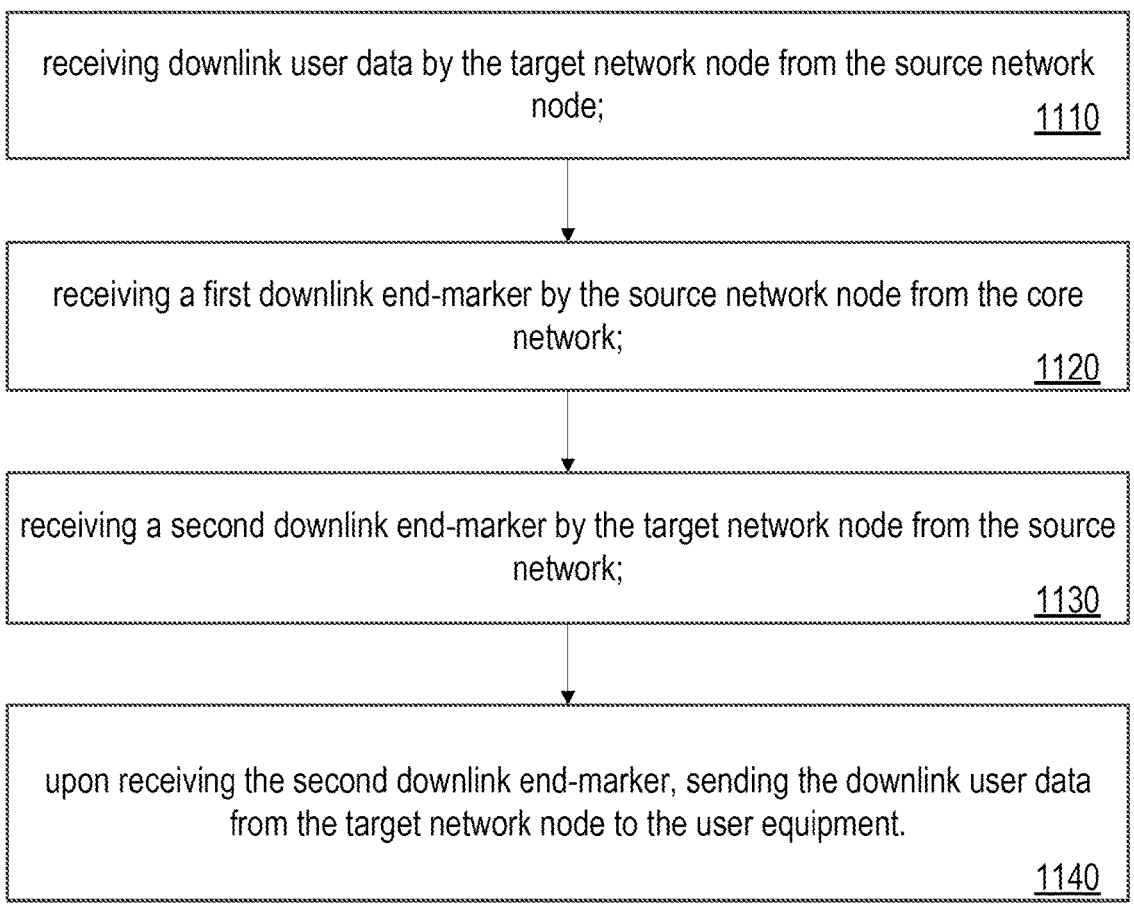
FIG. 11 shows a flow diagram of a method for wireless communication.

In another embodiment, referring to FIG. 11, the method 900 may further include a portion or all of the following: step 1110: receiving downlink user data by the target network node from the source network node; step 1120: receiving a first downlink end-marker by the source network node from the core network; step 1130: receiving a second downlink end-marker by the target network node from the source network; and step 1140: upon receiving the second downlink end-marker, sending the downlink user data from the target network node to the user equipment. In another implementation, another method may include a portion or all of the steps 1110-1140.

Figure 12:
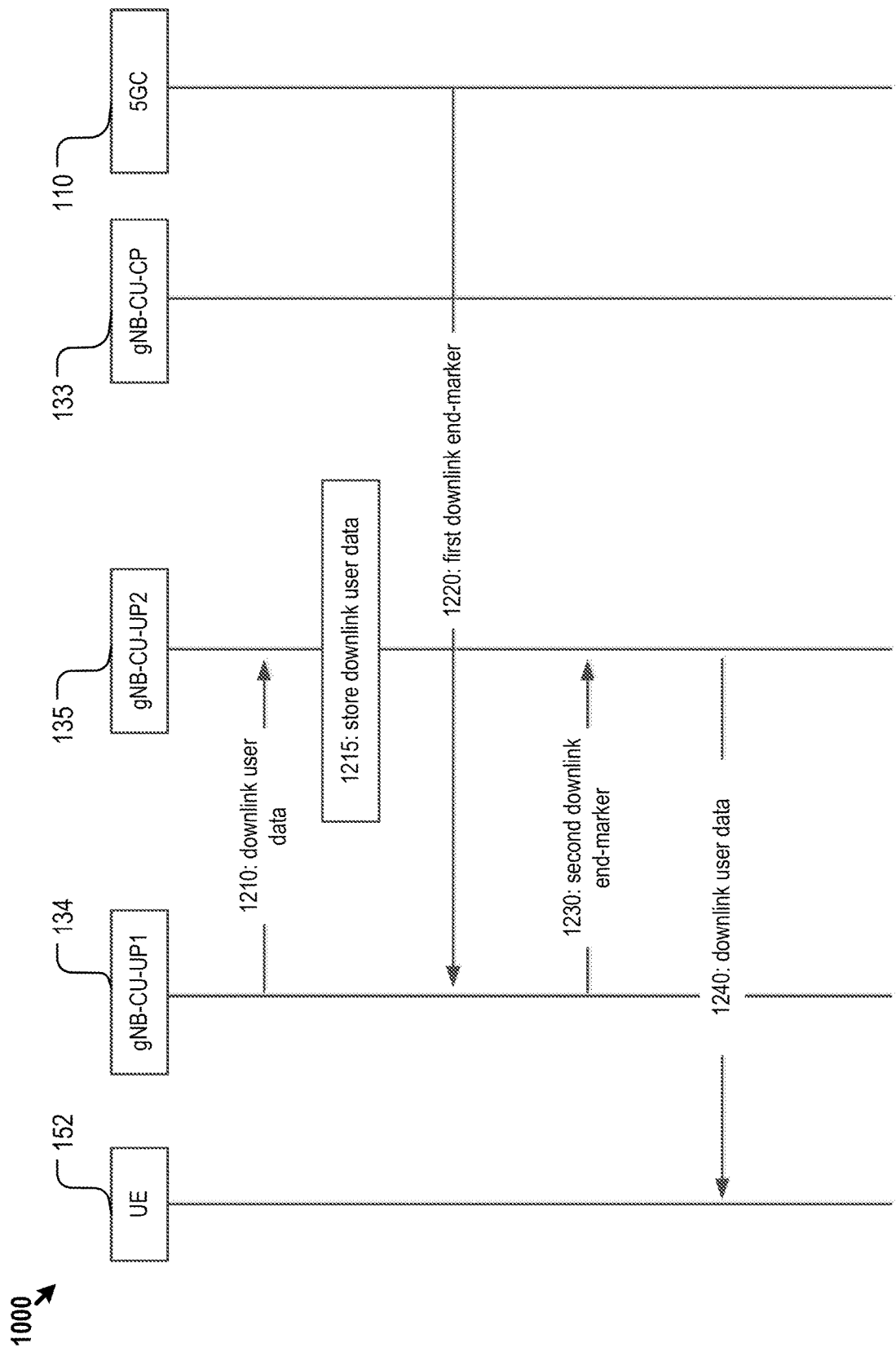
FIG. 12 shows an exemplary logic flow of the method for wireless communication in FIG. 11.

The method 1000 may further include the one or more steps shown in an exemplary logic flow in FIG. 12.

The method 1000 may include step 1210: the gNB-CU-UP1 sends downlink user data to the gNB-CU-UP2.

Optionally, the method 1000 may include step 1215: upon receiving the downlink user data, the gNB-CU-UP2 stores the downlink user data in a buffer or a memory.

The method 1000 may include step 1220: the 5GC sends a first downlink end-marker to the gNB-CU-UP1. The first downlink end-marker may indicate the gNB-CU-UP1 to stop sending downlink user data to the UE. In one implementation, the first downlink end-marker may include a GTP-U end-marker.

The method 1000 may include step 1230: upon receiving the first downlink end-marker, the gNB-CU-UP1 stops sending downlink user data to the UE, and sends a second downlink end-marker to the gNB-CU-UP2. The second downlink end-marker may indicate the gNB-CU-UP2 to begin sending downlink user data to the UE. In one implementation, the second downlink end-marker may include a GTP-U end-marker.

The method 1000 may include step 1240: upon receiving the second downlink end-marker, the gNB-CU-UP2 sends the downlink user data to the UE. The downlink user data may include the stored downlink user data received from the gNB-CU-UP1 in step 1210.

The present disclosure describes methods, apparatus, and computer-readable medium for wireless communication.

The present disclosure addressed the issues with establishing secure communication between a user equipment and a service application in a communication network. The methods, devices, and computer-readable medium described in the present disclosure may facilitate the performance of wireless communication by switching a QoS flow from a source network node to a target network node, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
switching, by a control plane (CP) of a central unit (CU) of a new generation radio access network node (gNB) at a first network node, a quality of service (QOS) flow from a first user plane (UP) of the CU of the gNB at a source network node to a second UP of the CU of the gNB at a target network node by:
sending, by the CP at the first network node, a first request to the second UP at the target network node;
receiving, by the CP at the first network node, a first response to the first request from the second UP at the target network node;
sending, by the CP at the first network node, a second request to the first UP at source network node;
receiving, by the CP at the first network node, a second response to the second request from the first UP at the source network node; and
sending, by the CP at the first network node, a radio resource control (RRC) reconfiguration complete indication to the first UP at the source network node by:
sending, by the CP at the first network node, a third bearer context modification request to the first UP at the source network node, the third bearer context modification request comprising the RRC reconfiguration complete indication, and receiving, by the CP at the first network node, a third bearer context modification response; or
sending, by the CP at the first network node, the RRC reconfiguration complete indication to the first UP at the source network node, wherein, upon receiving the RRC reconfiguration complete indication, the first UP at the source network node does not send a response to the CP at the first network node.

2. The method according to claim 1, further comprising:
prior to sending the RRC reconfiguration complete indication to the first UP at the source network node:
sending, by the CP at the first network node, an RRC reconfiguration to a user equipment; and
receiving, by the CP at the first network node, an RRC reconfiguration complete from the user equipment, wherein the RRC reconfiguration complete indicates a completion of the RRC reconfiguration.

3. The method according to claim 1, wherein:
the first request comprises a bearer context setup request comprising a list of to-be-setup data radio bearers (DRBs);
the first response comprises a bearer context setup response;
the second request comprises a bearer context release request comprising a list of to-be-released DRBs; and
the second response comprises a bearer context release response.

4. The method according to claim 3, wherein:
the first response comprises data-forwarding information; and
the second request comprises the data-forwarding information,
the data-forwarding information comprising general packet radio service (GPRS) tunneling protocol (GTP) tunnel information.

5. The method according to claim 1, wherein:
the first request comprises a bearer context setup request comprising a list of DRBs;
the first response comprises a bearer context setup response;
the second request comprises a bearer context modification request comprising a list of to-be-modified DRBs; and
the second response comprises a bearer context modification response.

6. The method according to claim 1, wherein:
the first request comprises a first bearer context modification request comprising a list of to-be-modified DRBs, the list of to-be-modified DRBs being configured to be modified according to the QoS flow;
the first response comprises a first bearer context modification response;
the second request comprises a second bearer context modification request; and
the second response comprises a second bearer context modification response.

7. The method according to claim 1, wherein:
the first request comprises a first bearer context modification request comprising a list of to-be-modified DRBs, the list of to-be-modified DRBs being configured to be modified according to the QoS flow;
the first response comprises a first bearer context modification response;
the second request comprises a bearer context release request; and
the second response comprises a bearer context release response.

8. An apparatus comprising:
a memory storing instructions; and
a processor in communication with the memory, wherein, when the processor executes the instructions, the processor is configured to cause the apparatus to perform the steps according to claim 1.

* * * * *